United States Patent
Denton (10) Patent No.: US 10,127,005 B2
(45) Date of Patent: Nov. 13, 2018

(54) MOBILE CLUSTER-BASED AUDIO ADJUSTING METHOD AND APPARATUS

(71) Applicant: Levaughn Denton, Baisley Park, NY (US)

(72) Inventor: Levaughn Denton, Baisley Park, NY (US)

( * ) Notice: Subject to any disclaimer, the term of this patent is extended or adjusted under 35 U.S.C. 154(b) by 506 days.

(21) Appl. No.: 14/862,304

(22) Filed: Sep. 23, 2015

(65) Prior Publication Data
US 2016/0085501 A1 Mar. 24, 2016

Related U.S. Application Data

(60) Provisional application No. 62/054,286, filed on Sep. 23, 2014.

(51) Int. Cl.
*H04R 29/00* (2006.01)
*H04S 7/00* (2006.01)
*G06F 3/16* (2006.01)
*H04R 27/00* (2006.01)

(52) U.S. Cl.
CPC .............. *G06F 3/165* (2013.01); *H04R 27/00* (2013.01); *H04R 2227/003* (2013.01); *H04R 2499/13* (2013.01); *H04S 7/40* (2013.01); *H04S 2400/15* (2013.01)

(58) Field of Classification Search
CPC ... G06F 3/165; H04R 27/00; H04R 2227/003; H04R 2499/13; H04S 7/40; H04S 2400/15
See application file for complete search history.

(56) References Cited

U.S. PATENT DOCUMENTS

| | | |
|---|---|---|
| 5,668,884 A | 9/1997 | Clair, Jr. et al. |
| 7,991,171 B1 | 8/2011 | Snow |
| 8,073,160 B1 | 12/2011 | Classen |
| 8,315,398 B2 | 11/2012 | Katsianos |
| 8,452,432 B2 | 5/2013 | Transeau |
| 8,594,319 B2 | 11/2013 | Ho et al. |
| 2004/0076305 A1 | 4/2004 | Santiago |
| 2004/0240676 A1 | 12/2004 | Hashimoto et al. |
| 2005/0160270 A1* | 7/2005 | Goldberg ............. G10H 1/0025 713/176 |
| 2006/0067550 A1* | 3/2006 | Puder ................... H04R 25/554 381/315 |
| 2006/0082458 A1 | 4/2006 | Shanks et al. |
| 2007/0217623 A1 | 9/2007 | Harada |
| 2009/0003620 A1* | 1/2009 | McKillop ............... G06F 3/165 381/80 |
| 2009/0058611 A1* | 3/2009 | Kawamura ............ H04N 7/185 340/10.1 |
| 2009/0076825 A1* | 3/2009 | Bradford .............. H04R 25/552 704/271 |

(Continued)

FOREIGN PATENT DOCUMENTS

EP 1971035 B2 8/2014

*Primary Examiner* — Thang V Tran
(74) *Attorney, Agent, or Firm* — Gearhart Law, LLC (57) ABSTRACT

The mobile cluster-based audio adjusting method and apparatus provides for a highly configurable sound management apparatus and process that combines standard computing devices such as laptops, tablets, and mobile phones to measure various aspects of sound waves across multiple points, allowing a single user to visualize and adjust sound output accordingly.

10 Claims, 7 Drawing Sheets

(56) References Cited

U.S. PATENT DOCUMENTS

| | | |
|---|---|---|
| 2010/0329471 A1 | 12/2010 | Dunn et al. |
| 2011/0134278 A1 | 7/2011 | Chang et al. |
| 2012/0189140 A1* | 7/2012 | Hughes .................. H04M 3/56 |
| | | 381/123 |
| 2013/0044131 A1 | 2/2013 | Milad |
| 2013/0064380 A1 | 3/2013 | Mahowald |
| 2013/0294618 A1 | 11/2013 | Lyubachev |

* cited by examiner

MOBILE CLUSTER-BASED AUDIO ADJUSTING METHOD AND APPARATUS

CLAIM OF PRIORITY

This application claims priority from U.S. Patent Provisional Application No. 62/054,286, filed on Sep. 23, 2014, the contents of which are hereby fully incorporated by reference.

FIELD OF THE EMBODIMENTS

The invention and its embodiments relate to audio manipulation and sound management systems, particularly for home audio systems, public address systems, sound reinforcement systems, vehicle audio systems, and associated software for these applications.

BACKGROUND OF THE EMBODIMENTS

Each year sound companies spend billions of dollars on audio technologies and audio research to find new ways to improve audio quality in performance settings. Very often sound systems are designed to be used in a specific environment. For example, in a vehicle or private room setting, audio manipulation and output quality techniques and technologies are either prescriptive or adaptive—neither of which require the need for audio engineering professionals. However, in other situations such as at a concert venue, a wide array of audio professionals must be employed. This can include monitor engineers, system technicians, and front-of-house engineers. These professionals operate mixing consoles and audio control units to produce desirable, high-quality audio output.

Whether prescriptive or adaptive, manned or unmanned, perceived sound quality is a function of complex transducer-based technologies and acoustic treatment that are typically controlled, managed and manipulated by humans, and/or audio software and hardware. As such, both human and physical capital are required to produce first-rate sound quality. However, even when the necessary human and capital has been spent, it can still be very difficult to effectively manage audio outputs in real-time. This is due to improper calibrations of signal propagation and signal degradation, as well as unwanted harmonics and soundwave reflections.

Particularly in an outdoor settings, single-source sound systems typically produce an intermittent mix of unintelligible sounds and echoes due to a given venue's size and openness. A popular solution for addressing the echo issue is to utilize distributed sound systems. Traditional distributed sound systems are less susceptible to sound variance than single source systems. However, even when these distributed systems are used, temperature gradients and wind can still steer sound in undesirable ways.

Another issue related to the size of a performance venue is when audio and video fall out of sync. As live musical performances become more and more elaborate by including digital art and screens on-stage, it is becoming increasingly difficult to reliably sync audio and video in large venues, due to highly reverberant surfaces and long decay times.

Also impacting audio intelligibility during a live performance is crowd noise. At a live event, it is not uncommon for crowds to generate noise approaching 105 dB. When this occurs, audio engineers must manipulate the supporting sound system output so that the performance audio remains 5-8 decibels higher than the noise generated by crowd. This action results in performance sound being broadcast above 110 dB, the range where the volume of sound begins to pose danger to human listeners. Frequently, audio system operators find it difficult to granularly control the loud perception of a given individual listener while managing loudness perception for the remainder of the audience. In a case where an audio quality trade-off decision has to be made, a common industry practice is to execute a remediation plan that favors the majority of listeners while the minority of listeners are forced to suffer through it.

A myriad of audio functions are necessary to provide a dynamic range of audio playback and fidelity. To meet the increasing needs and address new challenges, the devices of today will not only have to handle traditional telephony voice communication and low-fidelity voice recording, but also, these devices must be capable of incorporating new hardware and software to create new functions and applications. Further, such demands create the need to process signals using 'low-loss' methods by moving much of the processing function away from hardware and into software optimized to do so.

In other instances, when various pieces of audio equipment are slightly, or completely out-of-phase, it can be difficult for audio system operators to correct these out-of-phase issues in a short period of time.

Review of Related Technology:

Line6, Inc. has created a 'smart mixing system' for non-wearable ubiquitous computing devices that enables wireless and touchscreen control of live sound system components. This is accomplished via a wired connection between standard audio hardware and a proprietary physical interface. While this system integrates and controls live sound system components via touchscreen devices, it unfortunately relies on audio engineers to operate it, and does not incorporate a listener-centric way to autonomously solve audio issues experienced by an audience.

U.S. Pat. No. 5,668,884 pertains to an audio enhancement system and method of use with a sound system for producing primary sound from at least one main loudspeaker located at a main position. The audio enhancement system comprises at least one wireless transmitter, time delay circuitry, and plural augmented sound producing subsystems. Each sound subsystem is a portable unit arranged to be carried by a person located remote from the main loudspeaker and includes a wireless receiver and an associated transducer device, e.g., a pair of stereo headphones. The transmitter broadcasts an electrical signal which is representative of the electrical input signal provided to the main loudspeaker. The broadcast signal is received by the receiver and is demodulated and amplified to drive the transducer so that it produces augmented sound substantially in synchronism with the sound arriving from the main loudspeaker. To achieve that end the time delay circuitry delays the electrical signal which is provided to the transducer for a predetermined period of time corresponding generally to the time period it takes for the primary sound to propagate through the air from the main loudspeaker to the remote location at which the person is located.

U.S. Pat. No. 7,991,171 pertains to a method and apparatus for processing an audio signal in multiple audio frequency bands while minimizing undesirable changes in tonal qualities of the audio signal by determining an initial gain adjustment factor for each audio frequency band resulting from the application of an audio processing technique. A final gain adjustment factor for each band is selected from a corresponding set of weighted or unweighted initial gain adjustment factors. The set of initial gain adjustment factors from which the final gain adjustment factor for a specified audio frequency band is obtained is derived from other audio frequency bands that have the frequency of the specified band as a harmonic frequency. Changes in audio signal level within one audio frequency band thereby affect the signal level of harmonic frequencies to decrease relative changes in volume between a fundamental frequency and its harmonics.

U.S. Pat. No. 8,315,398 pertains to a method of adjusting a loudness of an audio signal may include receiving an electronic audio signal and using one or more processors to process at least one channel of the audio signal to determine a loudness of a portion of the audio signal. This processing may include processing the channel with a plurality of approximation filters that can approximate a plurality of auditory filters that further approximate a human hearing system. In addition, the method may include computing at least one gain based at least in part on the determined loudness to cause a loudness of the audio signal to remain substantially constant for a period of time. Moreover, the method may include applying the gain to the electronic audio signal.

U.S. Pat. No. 8,452,432 pertains to a user-friendly system for real time performance and user modification of one or more previously recorded musical compositions facilitates user involvement in the creative process of a new composition that reflects the user's personal style and musical tastes. Such a system may be implemented in a small portable electronic device such as a handheld smartphone that includes a stored library of musical material including original and alternative versions of each of several different components of a common original musical composition, and a graphic user interface that allows the user to select at different times while that original composition is being performed, which versions of which components are to be incorporated to thereby create in real time a new performance that includes elements of the original performance, preferably enhanced at various times with user selected digital sound effects including stuttering and filtering. The system may also optionally comprise a visualizer module that renders a visual animation that is responsive to at least the rhythm and amplitude of the system's audio output, not only for entertainment value but also to provide visual feedback for the user.

U.S. Pat. No. 8,594,319 pertains to methods and apparatuses for adjusting audio content when more multiple audio objects are directed toward a single audio output device. The amplitude, white noise content, and frequencies can be adjusted to enhance overall sound quality or make content of certain audio objects more intelligible. Audio objects are classified by a class category, by which they are can be assigned class specific processing. Audio objects classes can also have a rank. The rank of an audio objects class is used to give priority to or apply specific processing to audio objects sin the presence of other audio objects of different classes.

United States Patent Publication No. 2007/0217623 pertains to a real-time processing apparatus capable of controlling power consumption without performing complex arithmetic processing and requiring a special memory resource. The real-time processing apparatus includes an audio encoder that performs a signal processing in real time on an audio signal, a second audio encoder that performs the signal processing With a smaller throughput in real time on the audio, an audio execution step number notification unit that measures step number showing a level of the throughput in the signal processing by operating the 1st audio encoder or second audio encoder, and an audio visual system control unit that executes control so that the first audio encoder operates When the measured step number is less than a threshold value provided beforehand and the second audio encoder operates when the step number is equal to or greater than the threshold value.

United States Patent Publication No. 2011/0134278 pertains to an image/audio data sensing module incorporated in a case of an electronic apparatus. The image/audio data sensing module comprises: at least one image sensor, for sensing an image datum; a plurality of audio sensors, for sensing at least one audio datum; a processor, for processing the image datum and the audio datum according to a control instruction set to generate a processed image data stream and at least one processed audio data stream, and combining the processed image data stream and the processed audio data stream to generate an output data stream following a transceiver interface standard; a transceiver interface, for receiving the control instruction set and transmitting the output data stream via a multiplexing process; and a circuit board, wherein the image sensor, the audio sensors and the transceiver interface are coupled to the circuit board, and the processor is provided on the circuit board.

United States Patent Publication No. 2013/0044131 pertains to a method for revealing changes in settings of an analogue control console, the method comprising: receiving a captured image of the analogue control console; creating a composite image by superimposing the captured image and a live image of the analogue control console; and displaying the composite image.

United States Patent Publication No. 2013/0294618 pertains to a method and devices of sound volume management and control in the attended areas. According to the proposed method and system variants the sound reproducing system comprises: sounding mode appointment device, central station for audio signal transmittance; one or more peripheral stations for audio signal reception and playback; appliance for listener's location recognition; computing device for performing calculation concerning sounding parameters at the points of each listener's location and for performing calculation of controlling parameters for system tuning. The system can be operated wirelessly and can compose a local network.

Various devices are known in the art. However, their structure and means of operation are substantially different from the present invention. Such devices fail to provide a device that can help develop a participant's knowledge in a multitude of different subject areas, while simultaneously engaging the participant physically. At least one embodiment of this invention is presented in the drawings below, and will be described in more detail herein.

SUMMARY OF THE EMBODIMENTS

The present invention provides for a system comprising: at least one cluster of at least one computing device, said at least one computing device being equipped with: a sound sensing mechanism, capable of monitoring the amplitude and frequency of desirable and undesirable signals, a wireless transceiver, capable of wirelessly transmitting and receiving data from a audio control source, said data comprising at least one characteristic of at least one sound fingerprint; at least one output device, comprising: a power source for operating the device, a speaker for outputting sound, a communication mechanism, for receiving electronic information from said audio control source; said audio control source, in electronic communication said at least one cluster and said at least one output device, said audio control source comprising: a memory, containing computer-executable instructions for connecting to said at least one cluster, processing said at least one characteristic of at least sound fingerprint, visualizing said at least one sound fingerprint, varying the output of said at least one output device, providing an interface, a processor, for executing said computer-executable instruction, a interfacing mechanism, comprising: a network adapter, capable of transmitting and receiving electronic information through both wired and wireless communication; a display, for showing said interface and said at least one visualized sound fingerprint, at least one input mechanism, for manipulating said interface, and varying said output of said at least one output device.

The present invention also contemplates embodiments where said sound-sensing mechanism is an omnidirectional transducer, as well as embodiments where said display and said at least one input mechanism are one-in-the-same. The present invention may utilize short-range wireless technologies selected from the group consisting of: ANT+, Bluetooth®, cellular, IEEE 802.15.4, IEEE 802.22, ISA 100A, infrared, ISM, NFC, RFID, WPAN, UWS, Wi-Fi®, Wireless HART, Wireless HD/USB, ZigBee® and Z-wave®, and may employ an analog-to-digital converter, said analog-to-digital converter featuring an input structure selected from the group consisting of: fully-differential, pseudo-differential, wide input common mode, and single-ended. The present invention may also employ at least one audio codec, at least one application processor, and at least one baseband processor, software-defined radios, superheterodyne architecture radios, direct conversion architecture, or some combination thereof.

In yet another embodiment, the present invention uses a software-based radio, wherein said software-based radio isolates RF frequencies, said at least one computing device relays those frequencies to said audio control unit, wherein said audio control unit ensures that predetermined frequency thresholds are not breached. Further, the present invention may operate where electronic communications between said at least one computing device, said at least one cluster, said at least one output device, and said audio control unit are sent and received using an ambient backscatter techniques. The audio control source may employ a touch-sensitized screen as its input device, and when said at least one output device is located within said at least one cluster, such that said audio control source may alter the power supplied to said speaker in real-time.

Additionally, the present invention provides for a method of maintaining consistent sound across, comprising the steps of: providing at least one cluster of at least one computing device, said at least one computing device being equipped with: a sound sensing mechanism, capable of monitoring the amplitude and frequency of ambient noise, a desired signal, and an undesired signal, a wireless transceiver, capable of wirelessly transmitting and receiving data from an audio control source, said data comprising at least one characteristic of at least one sound fingerprint; at least one output device, comprising: a power source for operating the device, a speaker for outputting sound, a communication mechanism, for receiving electronic information from said audio control source; said audio control source, in electronic communication said at least one cluster and said at least one output device, said audio control source comprising: a memory, containing computer-executable instructions for connecting to said at least one cluster, processing said at least one characteristic of at least sound fingerprint, visualizing said at least one sound fingerprint, varying the output of said at least one output device, providing an interface, a processor, for executing said computer-executable instruction, a interfacing mechanism, comprising: a network adapter, capable of transmitting and receiving electronic information through both wired and wireless communication; a display, for showing said interface and said at least one visualized sound fingerprint, at least one input mechanism, for manipulating said interface, and varying said output of said at least one output device; sensing, measuring, and analyzing, by said at least one computing device, surrounding audio output signals; determining, by said at least one computing device, whether a qualifying signal has been sensed; identifying and categorizing said measurements, by said at least one computing device; determining, by said at least one computing device, whether said measurements breach a predetermined threshold; communicating, to other clusters, if present, and said audio control source, said breach; determining, by said other clusters, if present, and said audio control source if a second breach has occurred; adjusting, by said audio control source, based on said communicated measurements. In some embodiments, the method adjusts the at least one output device automatically based on predetermined values.

In an alternative embodiment, the present invention is capable of providing a visualized interface for user and/or listener-based sound management and control. It provides for a scalable platform that is future-proofed in the sense that it can incorporate devices that have yet-to-be invented as it uses standard protocols to seamlessly integrate additional components. This integration is supported with a dynamic software companion that mediates the system. A sound fingerprint, for the purposes of this disclosure comprises at least a frequency, intensity, and amplitude, but may also contain special-purpose sound information, salient to that specific application.

For example, the present invention can utilize a "sound preference" application. In one embodiment, this application sets user-based sound perception settings on a mobile device or wearable computer. There, the software can integrate with existing audio hardware and software, such as, but not limited to in-ear systems, mixer boards and other related audio mixing consoles. When the present invention integrates a device that is equipped with a microphone, the system is capable of autonomous audio sensing. That is, the microphone-equipped device will "listen" to sound and when sound of appropriate qualities are "heard", the system will begin providing metrics as to the nature of that sound. Preferably, the present invention will employ standardized protocols, allowing it to be industry-agnostic.

The present invention can be used to create sound fingerprints and used in conjunction with music publishing/performance applications. One way in which the present invention can be used in conjunction with a separate system is that it could relay fingerprint data directly to a music publishing entity in real-time. In an alternative embodiment, the present invention can relay information via various communication offerings such as e-mail, SMS, and visual screens. In another preferred embodiment, the present invention can have devices interface with it randomly, or can be configured to accept a predetermined number of "sensing" units.

Preferably, the present invention will incorporate commercial ubiquitous devices and wearable computers from a listening audience, and as such, does not need intervention from listeners or audio professionals such as a front-of-house engineer to operate. In short, each listening device (i.e. smartphone, tablet, wearable, laptop, etc.) that has interfaced with the system is able to 1) serve as a reasonable approximation of a human ear (audio) response 2) "sense" (measure) sounds within a frequency response range of: 20 Hz to 20 kHz, and 3) provide visualized metrics based on these measurements.

In an alternative embodiment, the present invention interfaces with a cluster of ubiquitous computing devices and wearable computers, all used to collaboratively sense and analyze the signal characteristics of undesired sound(s). These devices can then wirelessly transmit their findings to a central audio mixing source where acoustic-fingerprint observations can be visualized and audio output is controlled. This embodiment can ultimately reduce the amount of audio professionals needed in a live performance environment, improve the music-listening experience for an audience at a micro-level; and create additional opportunities in the acoustic-fingerprint commercial landscape.

In yet another preferred embodiment, various in-ear systems may be integrated into the present invention, software-defined and/or cognitive-defined based in-ear transceivers can be used to wirelessly communicate with a audio control source and thus, the output of such an in-ear monitor can be autonomously adjusted after sensing audio output. A given output can be adjusted according to what is sensed within specified location or what is sensed at external clusters. Similarly to a software-defined and/or cognitive-defined based in-ear transceivers, an in-ear monitor system for use with the present invention will preferably comprise hardware such as, earphones, at least one body pack receiver, at least one mixer and at least one transmitter. These functions can also be adjusted and controlled via the audio control source of the present invention.

Not only does the use of system wide software-defined and/or cognitive-defined radios create the opportunity to reduce the physical footprint of 'front-end RF circuits' on a smart device and wearable computer, but this reduced physical footprint allows for more devices to be interfaced with the present invention simultaneously. Also, incorporating software-defined radios will enable these devices to filter and isolate specific frequencies, allowing and that may have an unnecessary amount of signal energy associated with it, highlight this face, and communicate specific measurements back to a audio control source. For adjustment by a user, or by logic contained in the system of the present invention.

In yet another preferred embodiment, system components and preferably the interfaced devices can send wireless signals to each other using ambient backscatter techniques. Incorporating backscatter techniques into the system allows for the appropriation of wireless signals that are reflected or scattered within the confines of a space; allowing system components and compatible interfaced devices to communicate continuously, near-continuously, or on some predetermined interval while sustaining their charge for an optimal amount of time.

It is an object of the present invention to provide a system that can interface with various microphone-equipped devices to create sound fingerprints.

It is an object of the present invention to provide a system that can create these fingerprints in real-time.

It is an object of the present invention to provide a means to autonomously manage audio outputs.

It is an object of the present invention to provide a means to maintaining high power efficiency amongst interfaced devices and system components.

It is an object of the present invention to provide a means to use a cluster of sound recording devices to report perceived sound information.

It is an object of the present invention to provide a means to incorporate existing internet-enabled, microphone-equipped devices to create a sound-sensing network.

It is an object of the present invention to provide a means to obtain and visualize recorded sound information in real-time.

It is an object of the present invention to provide a means to provide a means to balance sound levels to reduce or cancel out unwanted noise in a performance venue.

It is an object of the present invention to provide a means to reduce the physical footprint of 'front-end RF circuits' on an electronic device equipped with a wireless transceiver or similar technology.

It is an object of the present invention to provide a means to filter and isolate specific frequencies.

It is an object of the present invention to provide for a way to maintain a high power efficiency among the devices that have interfaced with the present invention.

It is an object of the present invention that the audio mixing source includes a central mixing source.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As a threshold matter, it should be noted that whenever the phrases "microphone" or "microphone-equipped" are used, it is intended to refer to any device that is capable of detecting sound, not merely microphones. For example, a high-performance low frequency antenna connected to a software-defined radio may be used to input sound observations into the system, or a piezo-electric diagraph may be used to measure the vibrations the correspond to a given sound. These examples are provided to give greater clarity as to what the term "microphone" should be interpreted as, and not construed as a limiting example.

The system of the present invention operates by integrating clusters of various computing devices and wearable computers with sound management techniques and methods so that various sound "fingerprints" can be developed and used to visualize how sound is being perceived in micro-areas within a larger venue. In various embodiments, the system of the present invention can be integrated into an individual's home, vehicle audio system, concert venues, and other locations where sound is played. In addition, the system's components allow for the present invention to be scaled to accommodate sound management and monitoring control within the largest of venues such as stadiums and other sports arenas.

Due to the devices that are integrated into the system having the ability to sense the frequency and magnitude of audio signals, a sound fingerprint (summary) can be generated from deterministic methods. These fingerprints are then communicated to an audio control source and can subsequently be processed and used to communicate with external applications and things such as third party sound databases. However, the purpose of this system is not to be confused. In addition to the sound fingerprinting ability of the present invention, it is also capable of utilizing a series of methods to sense and control audio output in various venues.

In an alternative embodiment, the present invention is located in a train or airport station that has an intercom system that functions poorly when noisy crowds are present. If an audio control source within these facilities is able to autonomously collect audio data via a series of integrated devices, then with the present invention, the same audio control source can adjust system outputs accordingly in order to make important intercom announcements intelligible. In yet another embodiment, a user can enter in EQ parameters in their integrated computing device to ensure that both the audio perceived by them, and the audio perceived by their device is in accordance with some pre-determined parameters/settings. While many short-range wireless technologies can be used with the present invention, preferably one or more of the following technologies will be used: ANT+, Bluetooth, cellular, IEEE 802.15.4, IEEE 802.22, ISA 100a, Infrared, ISM (band), NFC, RFID, WPAN, UWS, WI-FI, Wireless HART, Wireless HD/USB, ZigBee, or Z-wave.

Figure 1:
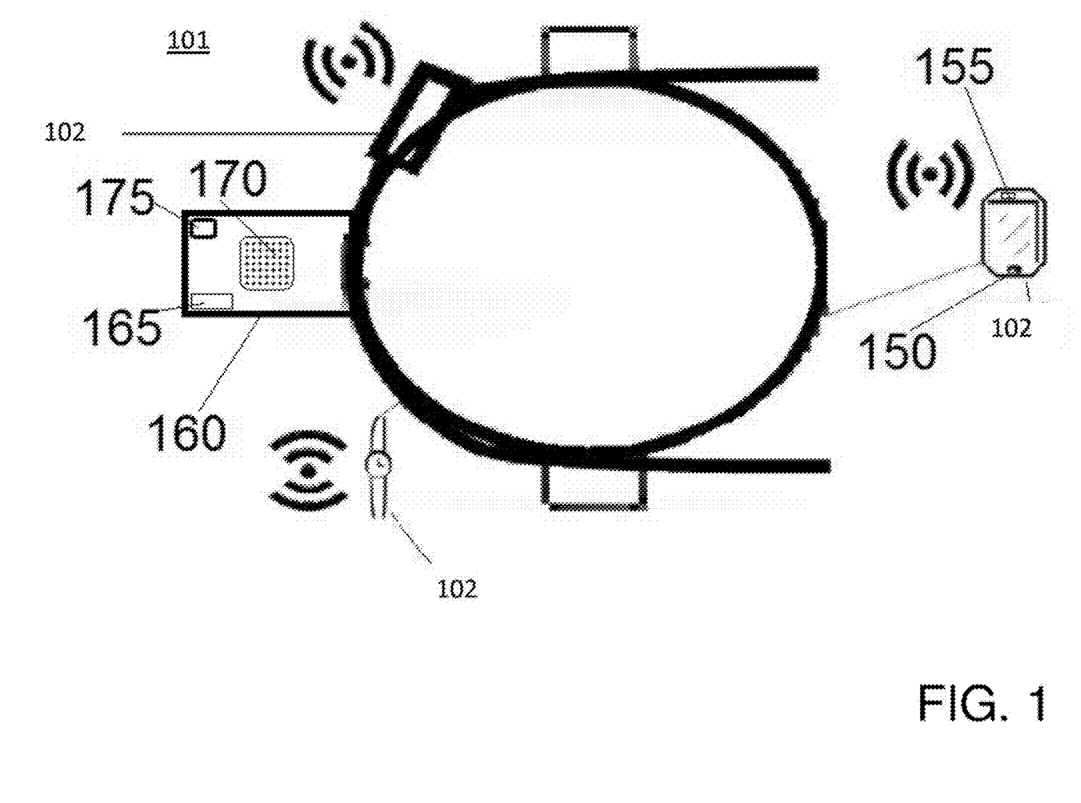
FIG. 1 shows a schematic view of an embodiment of one cluster of the present invention with some interfaced devices.

Referring to FIG. 1, an embodiment of one cluster 101 of the present invention with some interfaced devices. Specifically, three embodiments of at least one computing device 102 are shown; wearable glasses, wearable watch, and a smartphone. It should be noted that while these three devices are listed as exemplary examples, any device with a sound sensing mechanism 150 and a way to transmit any recorded data is suitable for use as one of said at least one computing devices 102. Preferably, the sound sensing apparatus will be an omnidirectional transducer. The sound sensing mechanisms of at least one computing device 102 will be able to convert perceived sounds into electronic signals so that the recorded information may be transmitted to neighboring clusters 101, or a audio control source (See FIG. 3), as desired. This data will be transmitted using either one or a combination of short-range wireless technologies, namely, ANT+, Bluetooth, cellular, IEEE 802.15.4, IEEE 802.22, ISA 100a, Infrared, ISM (band), NFC, RFID, WPAN, UWS, WI-FI, Wireless HART, Wireless HD/USB, ZigBee, or Z-wave. Preferably, transducers integrated into these computing devices have an output signal that is fed into the input of an analog-to-digital converter ("ADC") and can incorporate software and cognitive-defined radios to broaden the selection of compatible wireless communication interfaces and limit radio component footprints. According to an embodiment, the at least one computing device 102 includes one or more wireless transceivers 155.

Figure 2:
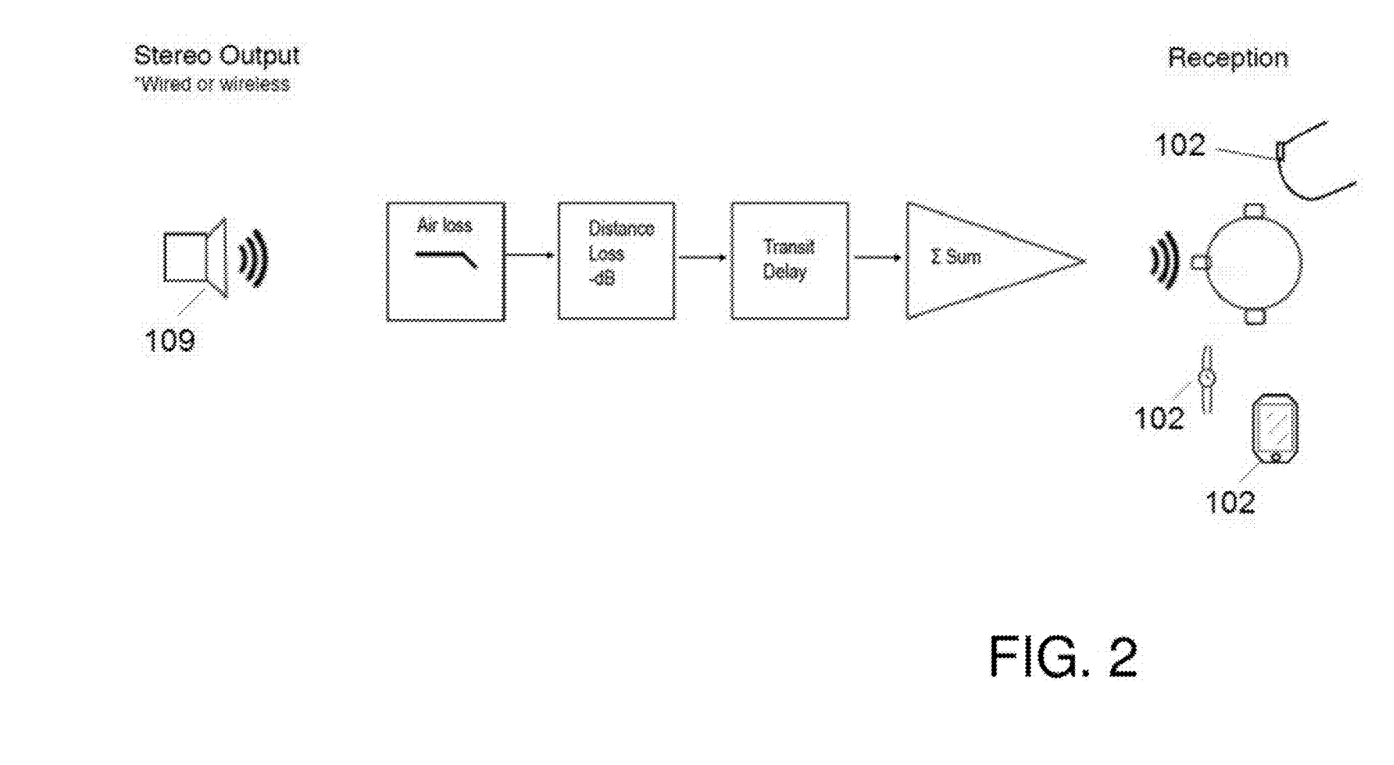
FIG. 2 shows a schematic view of how interfaced devices create a sound fingerprint.

FIG. 2 shows a schematic view of how interfaced devices create a sound fingerprint. The sound transmission of the audio energy 109 sensed by the at least one computing device 102 propagates through air and is received by at least one computing device 102 using the transmission path outlined in FIG. 2.

Assuming that FIG. 2 depicts audio transmission in an indoor setting, at specified time intervals, each computing device measures the sound pressure level (SPL) and sound power level (SWL):

$$SPL = SWL + 10\log\left[\frac{Q_\theta}{4\pi r^2} + \frac{4}{R_C}\right]$$

Where:
SPL=Sound pressure level dB
SWL=Sound power level=10 $\log_{10}(W/W_{ref})$
W is the total sound power radiated from a source with respect to a reference power ($W_{ref}$) dBW re $10^{-12}$ Watts.
r=distance from source m
$Q_\theta$=directivity factor of the source in the direction of r
S=total surface area of a room m$^2$
$\alpha_{av}$=average absorption coefficient in a room $$R_C = \text{room constant} = \frac{S\alpha_{av}}{1-\alpha_{av}}m^2$$

Over time, each computing device in FIG. 2 detects differences in pressure (i.e. change in pressure vs. time) and converts the differences into an electrical signal. A Fast Fourier Transform is implemented (locally or in a cloud) to measure the relative amplitudes of the frequencies 'sensed' and to perform other frequency domain analyses.

It is important to note that in any given indoor environment, $R_C$, $\alpha_{av}$, and S can be predetermined and made available to each computing device, approximated or deemed negligible. Also note that each computing device in FIG. 2 has a microphone. Computing devices may also obtain sound observations via a high-performance low frequency antenna.

Figure 3:
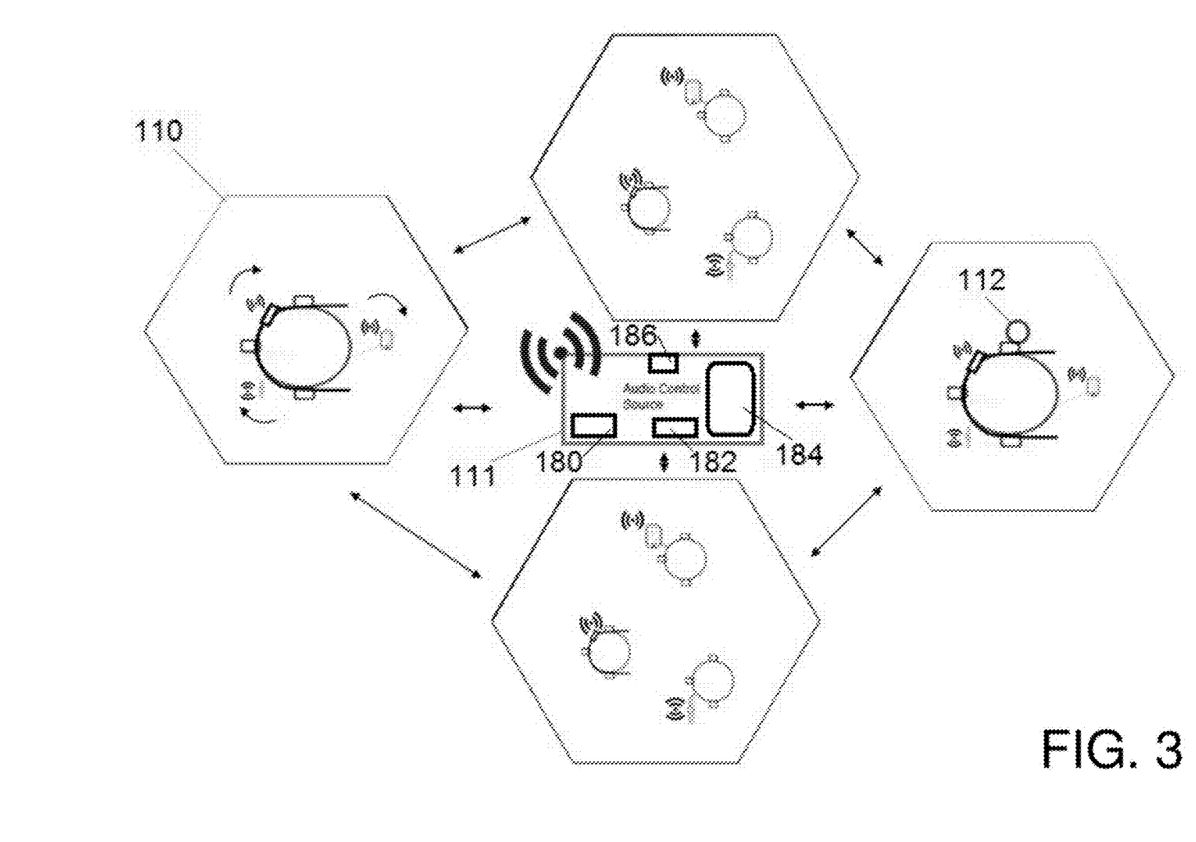
FIG. 3 shows an illustration of an embodiment of the system of the present invention engaging in inter-cluster, cluster-to-audio control source; and cluster-to-cluster data sharing.

Turning to FIG. 3 an illustration of an embodiment of the system of the present invention engaging in intra-cluster, cluster-to-audio control source; and cluster-to-cluster data sharing. Here, each cluster has a given location 110 (i.e. specified location) to accurately isolate and associate the sensed data. In one embodiment, the present invention is able to adjust a given output device 160 based on its proximity to a given location 110 of a cluster. In alternative embodiments, output devices 160 can be adjusted based on their proximity to more than one cluster. Devices in each cluster can either communicate directly to each other or an audio control source 111, devices within a cluster can communicate to a single device within that cluster which can serve as a gateway to other clusters and/or audio control source 111. In some embodiments, the present invention farther comprising an in-ear monitoring device 112. According to an embodiment, the output devices 160 may include a power source 165 (such as, e.g., a battery or other suitable power source 160), a speaker 170, a communication mechanism 175 (such as, e.g., a wired and/or wireless transceiver), and/or any other suitable mechanisms (as shown in FIG. 1). According to an embodiment, the audio control source 111 includes a memory 180, a processor 182, an interface mechanism 184, and/or at least one input mechanism 186. According to an embodiment, the interface mechanism 184 is a graphical user interface with a display (e.g., a touch screen display). According to an embodiment, the at least one output device 160 is located within said at least one cluster 101, such that said audio control source 111 may alter the power supplied to said speaker 170 in real-time.

The embodiment depicted here shows devices that sense audio signal energy within the confines of a single cluster and then sends data directly to an audio control unit and other clusters. Therefore, not only can these computing devices wirelessly share sensed data with each other, but data can be shared with audio control source 111 (for audio output management purposes) and other devices in other clusters. Depending on the audio signal energy sensed within a specific cluster(s), audio control source 111 adjusts any connected output devices in either a single cluster, or multiple clusters to ensure high quality/fidelity output.

Figure 4:
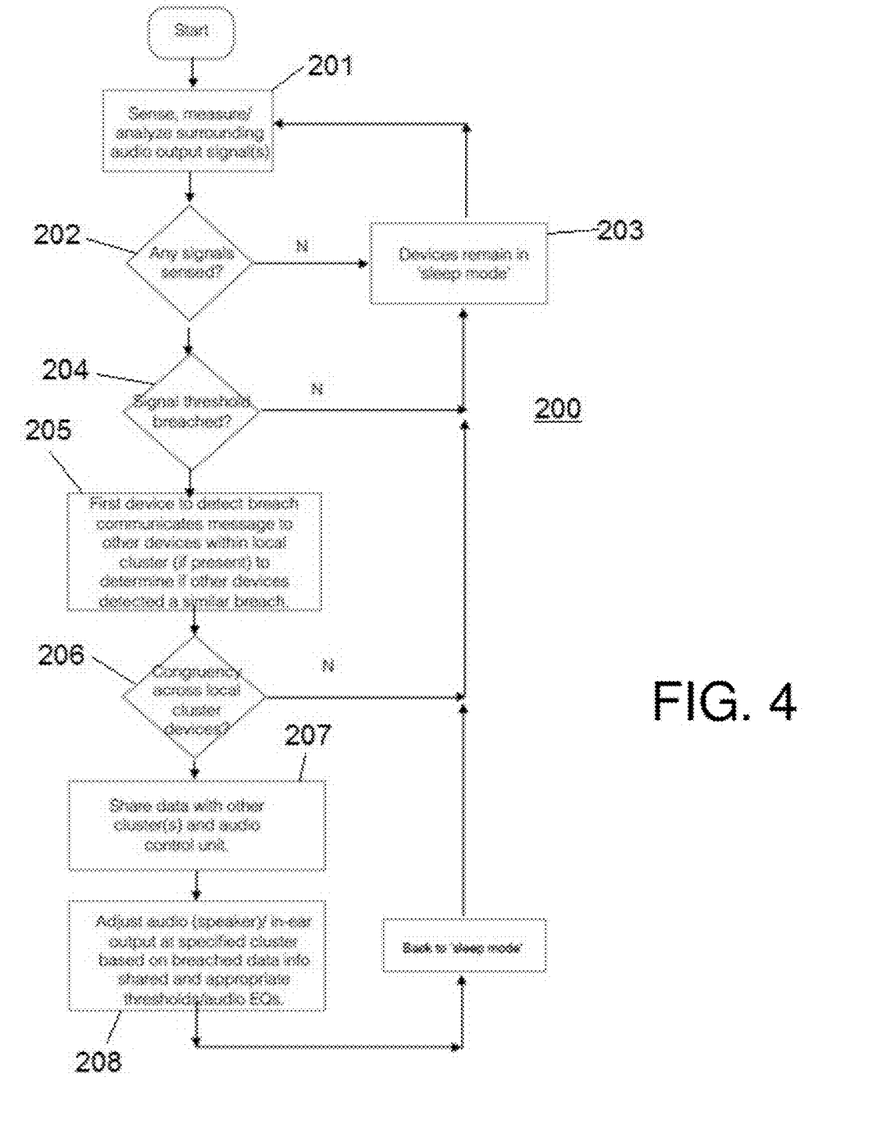
FIG. 4 shows a flow chart outlining an embodiment of the method of the present invention.

FIG. 4 shows a flow chart outlining an embodiment of the method of the present invention. Here, method 200 is comprised of a number of steps. In step 201, initially, both desired and undesired audio output signals are sensed and subsequently analyzed. In step 202, the method proceeds to determine whether or not the input signals match a set of predefined thresholds. If there is only negligible output audio, that is, if the audio within an environment is outside of a specified frequency range, the method proceeds to step 203 where the devices in each cluster operate in sleep mode. If there is indeed sensible audio output, the method proceeds to step 204 where the present invention determines if the predefined threshold or EQ setting is breached. If this threshold had been breaches, the method moves to step 205 where the first device that sensed the breach will (preferably, wirelessly) communicate its signal measurements to other devices within its cluster and the receiving device will conduct the same audio measurements to confirm the threshold breach. Preferably, step 205 is repeated amongst all of the devices within a single cluster, to provide more robust data sets. Once the breach confirmation stage is completed, in step 206, the present invention moved to step 207 where at least one computing device is chosen to communicate the breach to. Finally, in step 208, when the present invention, via the audio control source, adjusts audio levels at the at least one output device to transform undesired audio outputs to desired audio outputs.

Figure 5A:
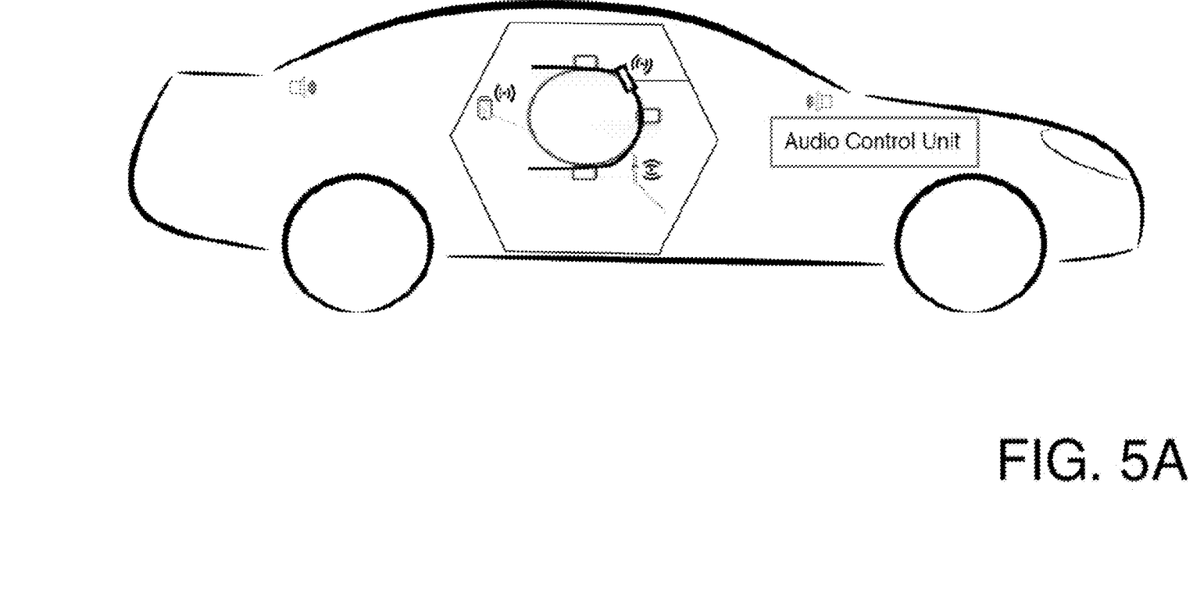
FIG. 5A shows an illustration showing an embodiment of the present invention located in an automobile.
Figure 5B:
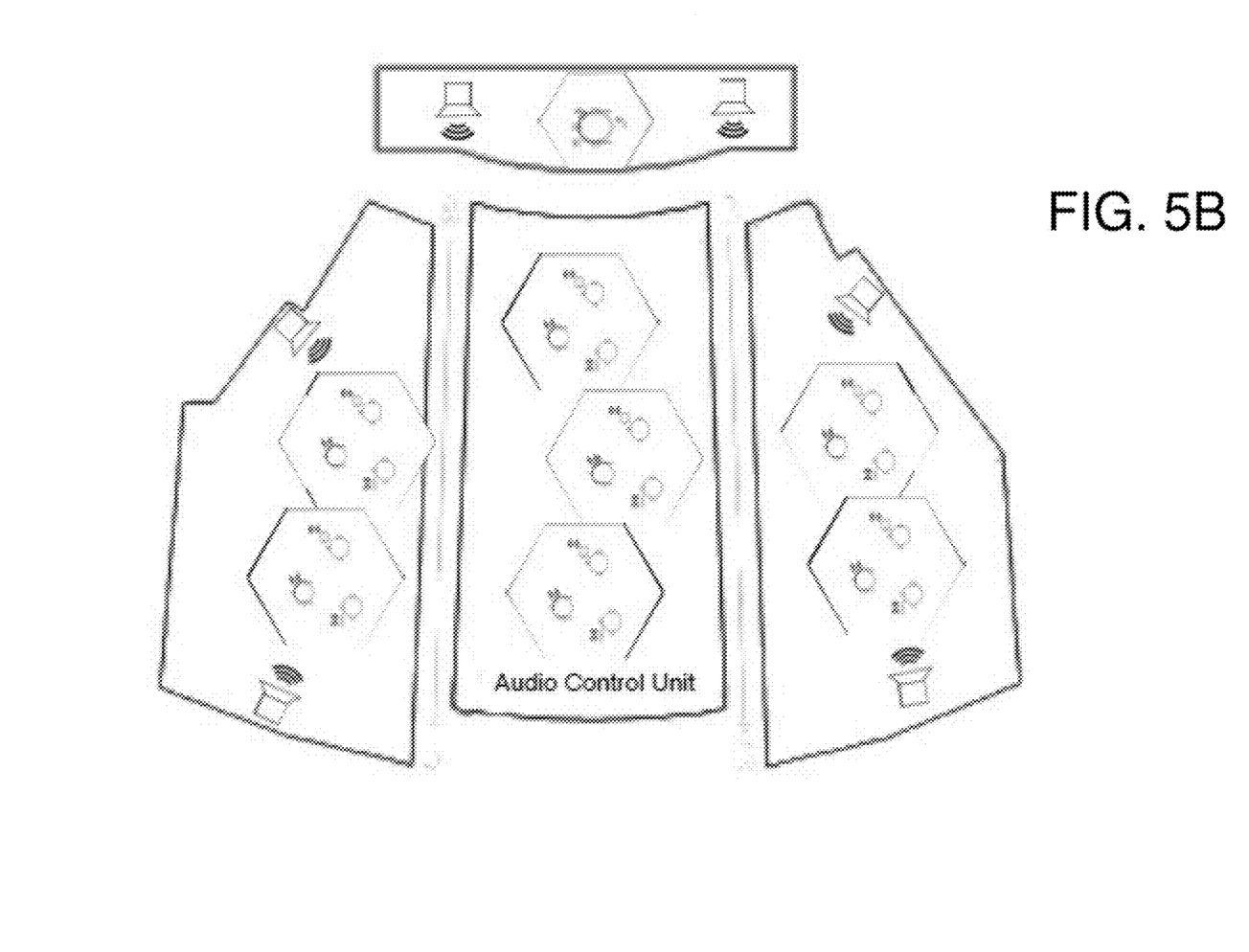
FIG. 5B shows an illustration showing an embodiment of the present invention located in an indoor theatre.
Figure 5C:
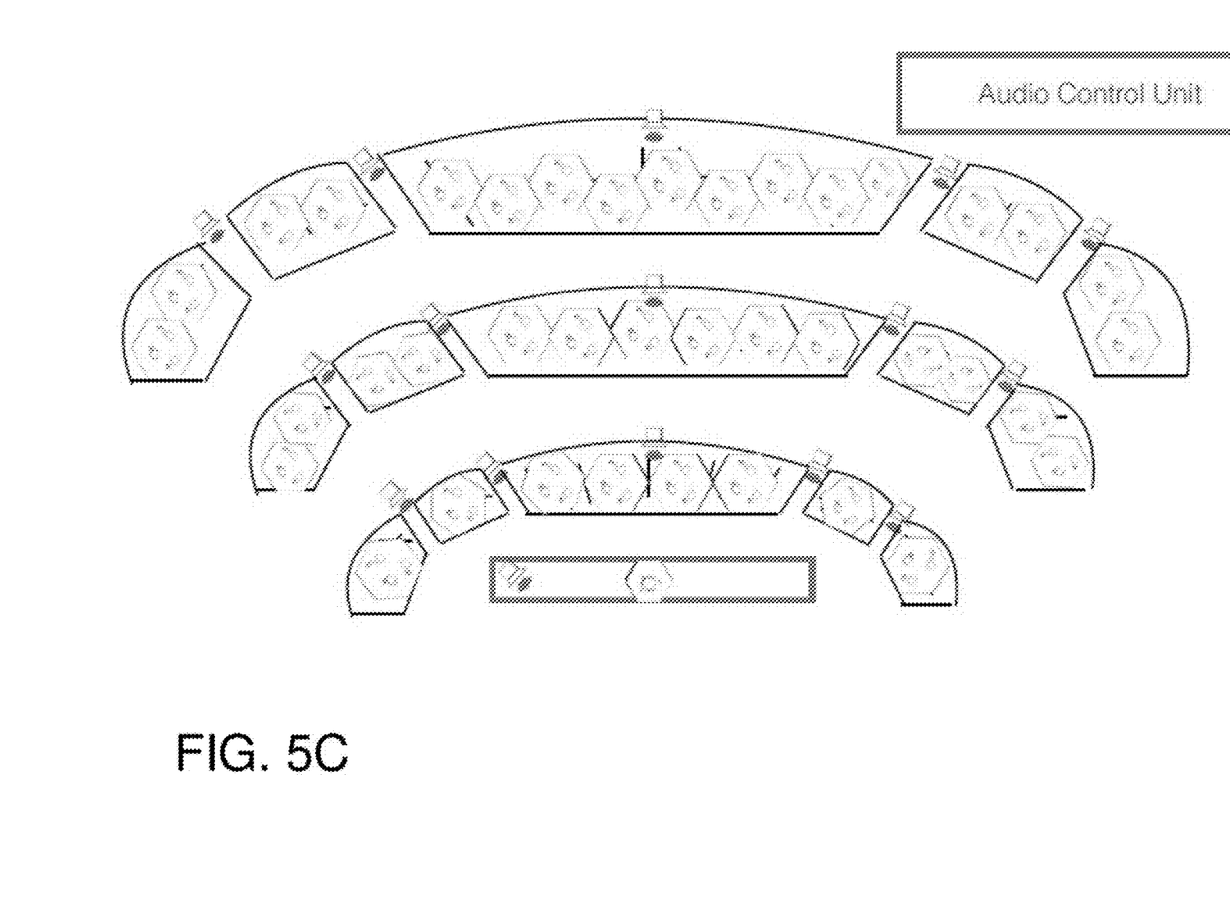
FIG. 5C shows an illustration showing an embodiment of the present invention located in an outdoor stadium.

Referring to FIGS. 5A-5C, various embodiments of the present invention implemented in an automobile, an indoor theatre, and an outdoor stadium, respectively, are shown. While these venues are particularly suited for the present invention to be implemented in, any venue in which there are multiple listeners.

In a preferred embodiment, the sound sensing mechanisms (preferably, transducers) used within each "sensing" computer/device outputs an output signal that is fed into the input of an ADC. In the configurations described in FIGS. 5A, 5B and 5C, a single-ended ADC interface can be used effectively since ADCs and the transducer source are both located on the same integrated circuit board. However, since fully differential interfaces have performance gains over single-ended inputs due to its inherent noise rejection characteristics, using a fully-directional interface instead of a single-ended interface may be desirable.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. A system comprising:
   an audio control source;
   at least one cluster of at least one computing device, said at least one computing device comprising:
      a sound sensing mechanism, configured to monitor the amplitude and frequency of both a desired and an undesired frequency; and
      a wireless transceiver, configured to wirelessly transmit and receive data from said audio control source,
      said data comprising at least one characteristic of at least one sound fingerprint,
      wherein said at least one sound fingerprint includes a frequency and magnitude of one or more audio signals;
   at least one output device, comprising:
      a power source for operating the output device;
      a speaker for outputting sound; and
      a communication mechanism, for receiving electronic information from said audio control source;
   said audio control source, in electronic communication said at least one cluster and said at least one output device, said audio control source comprising:
      a memory, containing computer-executable instructions for connecting to said at least one cluster, processing said at least one characteristic of at least sound fingerprint, visualizing said at least one sound fingerprint, varying the output of said at least one output device, providing an interface;
      a processor, for executing said computer-executable instruction;
      a interfacing mechanism, comprising:
         a network adapter, configured to transmit and receive electronic information through both wired and wireless communication:
         a display, for showing said interface and said at least one visualized sound fingerprint; and
         at least one input mechanism, for manipulating said interface, and varying said output of said at least one output device.

2. The system of claim 1, wherein said sound-sensing mechanism is an omnidirectional transducer.

3. The system of claim 1, wherein said display and said at least one input mechanism are one-in-the-same.

4. The system of claim 1, wherein said wireless transceiver utilizes short-range wireless technologies.

5. The system of claim 1, wherein said input device is a touch-sensitized screen.

6. The system of claim 1, wherein said at least one output device is located within said at least one cluster, such that said audio control source may alter the power supplied to said speaker in real-time.

7. A method of maintaining consistent sound across, comprising the steps of:
 a) providing at least one audio control source;
 b) providing at least one cluster of at least one computing device, said at least one computing device comprising:
  a sound sensing mechanism, configured to monitor the amplitude and frequency of ambient noise; and
  a wireless transceiver, configured to wirelessly transmit and receive data from said audio control source,
  said data comprising at least one characteristic of at least one sound fingerprint;
  at least one output device, comprising:
  a power source for operating said at least one output device;
  a speaker for outputting sound; and
  a communication mechanism, for receiving electronic information from said audio control source;
  said audio control source, in electronic communication said at least one cluster and said at least one output device, said audio control source comprising:
   a memory, containing computer-executable instructions for connecting to said at least one cluster, processing said at least one characteristic of at least sound fingerprint, visualizing said at least one sound fingerprint, varying the output of said at least one output device, providing an interface;
   a processor, for executing said computer-executable instruction;
   a interfacing mechanism, comprising:
    a network adapter, configured to transmit and receive electronic information through both wired and wireless communication;
    a display, for showing said interface and said at least one visualized sound fingerprint; and
    at least one input mechanism, for manipulating said interface, and varying said output of said at least one output device;
 c) sensing, measuring, and analyzing, by said at least one computing device, surrounding audio output signals, resulting in one or more measurements;
 d) identifying and categorizing said measurements, by said at least one computing device to identify any qualifying signals wherein a qualifying signal correlates to a measurable audible sound;
 e) determining, using said at least one computing device, whether a first qualifying signal and a second qualifying signal in the one or more measurements has been sensed;
 f) determining, by said at least one computing device, whether the first qualifying signal breaches a predetermined threshold, forming a first breach;
 g) communicating, to other clusters, if present, and said audio control source, said first breach;
 h) determining, using said at least one computing device, if the second qualifying signal breaches said predetermined threshold, forming a second breach;
 i) determining, by said other clusters, if present, and said audio control source if the second qualifying signal breaches said predetermined threshold, forming a second breach;
 j) if said first breach and said second breach have been formed, adjusting said at least one output device, by said audio control source, based on said one or more measurements.

8. The method of claim 7, wherein step j) is done automatically based on predetermined values.

9. The method of claim 7, further comprising the step of k) entering, by said at least one computing device, sleep mode.

10. The method of claim 7, wherein said wireless transceiver utilizes short-range wireless technologies.

* * * * *